United States Patent [19]

Sullivan

[11] Patent Number: 4,674,237
[45] Date of Patent: Jun. 23, 1987

[54] SCOURING PAD DEVICE AND METHOD FOR MAKING SAME

[75] Inventor: William E. Sullivan, Blythewood, S.C.

[73] Assignee: Risdon Enterprises, Inc., Columbia, S.C.

[21] Appl. No.: 261,543

[22] Filed: May 7, 1981

[51] Int. Cl.⁴ ............................................. B24D 15/00
[52] U.S. Cl. ......................................... 51/391; 51/400; 51/401; 401/201
[58] Field of Search ................. 51/391, 392, 393, 394, 51/400, 401, 402, 403, 407; 15/104.93; 252/91, 92, 93; 401/196, 201

[56] References Cited

U.S. PATENT DOCUMENTS

| | | | |
|---|---|---|---|
| 2,899,780 | 8/1959 | Bottino | 401/201 |
| 3,014,233 | 12/1961 | Gibbons | 401/201 |
| 3,066,347 | 12/1962 | Vosbikian et al. | 401/201 |
| 3,112,584 | 12/1963 | Cameron | 15/209 R |
| 3,175,331 | 3/1965 | Klein | 51/402 |
| 3,377,151 | 4/1968 | Lanham | 51/400 X |
| 3,431,689 | 3/1969 | Schnabel | 51/400 |
| 3,468,096 | 9/1969 | Franz | 401/201 X |
| 3,581,447 | 6/1971 | Falivene | 51/400 |
| 4,094,119 | 6/1978 | Sullivan | 53/4 |

*Primary Examiner*—Robert P. Olszewski
*Attorney, Agent, or Firm*—St. Onge Steward Johnston & Reens

[57] ABSTRACT

An improved scouring pad device comprises first and second bats each of which is made of a porous, fiberous, heat-weldable, polymeric material having an outer abrasive surface and an inner surface opposite the outer abrasive surface. An envelope layer of fluid impervious, heat-weldable, sheet-like polymeric material, and having outwardly and inwardly facing surfaces, lies adjacent each of the bats with the outwardly facing surface of the envelope layer confronting the inner surface of the bat. A reservoir layer of heat-weldable liquid absorbent material is disposed between the inwardly facing surfaces of the envelope layers. The bats, the two envelope layers, and the reservoir layer are welded together at a continuous closed boundary. A cleaning composition such as soap is carried in the reservoir layer and is temporarily confined between the first and second envelope layers within the boundary. Each of the envelope layers is perforated, having at least one hole therethrough, so that the cleaning composition can be released through at least one of the bats, to the abrasive surface of that bat. A method employing mass production techniques is also disclosed for manufacturing such scouring pad devices.

16 Claims, 4 Drawing Figures

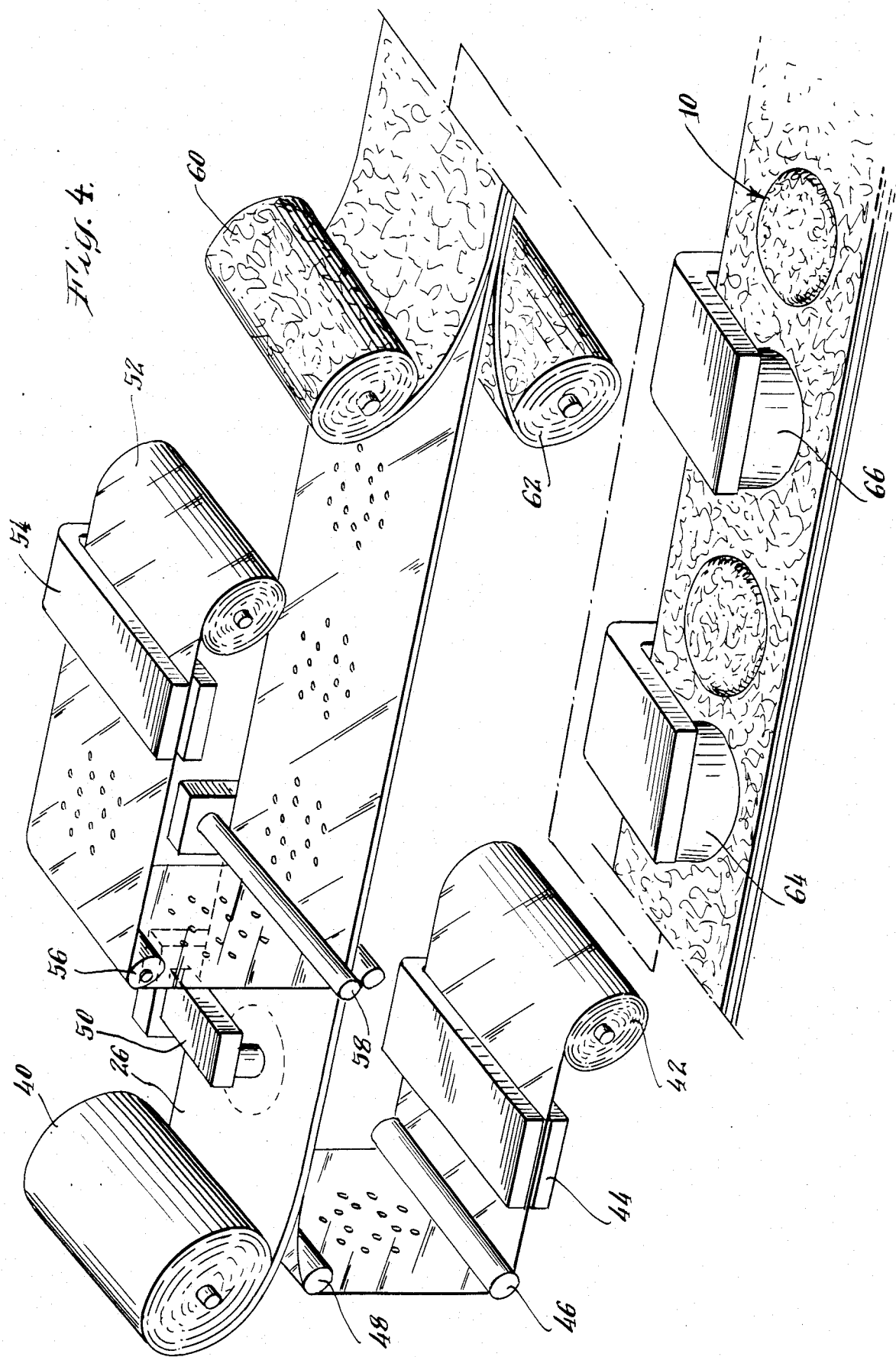

4,674,237

SCOURING PAD DEVICE AND METHOD FOR MAKING SAME

BACKGROUND OF THE INVENTION

1. Field of the Invention

The present invention relates to a scouring pad device and a method for making the device. More particularly, the present invention relates to a scouring pad device that contains a cleaning or polishing composition which is released at a controlled rate over an extended period of time.

The present invention also relates to a method of making scouring pad devices that employs heat or ultrasonic welding technology to achieve mass production efficiencies.

2. Description of the Prior Art

Scouring pad devices are typically used in commerical, institutional, and consumer applications to clean cooking utensils such as aluminum, stainless steel and copper pots and pans. Most widely known scouring pad devices include a pad of steel wool. A soap or a polishing composition, which is soluble in water, is carried in the interstices between fibers of the steel wool. Accordingly, when the pad is immersed in water, the cleaning composition dissolves and is carried to the surfaces of the pad. Motion of the pad over the surface of the utensil then cleans and polishes the utensil.

Such commonly used scouring pad devices have inherent drawbacks. Most notably, since the soap or polish composition is merely held in the readily accessible interstices between adjacent fibers of the steel wool, it may be dissolved and carried away from the pad in a relatively short period of time. Additionally, the steel wool with which the pad is made can oxidize or rust and in fact does so rapidly after it has been immersed in water for the first time.

Attempts have been made to solve certain of the drawbacks of such commonly used scouring pad devices. Most notably, fiberous polymeric materials which are non-woven or randomly spun into a pad that is joined randomly together to maintain the integrity of the pad, and synthetic and natural sponge-like materials have been substituted for steel wool and other like metalic materials. Again, however, soap or polishing compositions are commonly impregnated or carried in the interstices in the sponge or between adjacent fibers of the polymeric material in much the same fashion as are such compositions in steel wool scouring pads. Accordingly, while the problem of oxidization of the pad itself is avoided with polymeric and naturally corrosion resistant pad materials, the problem of rapid use of the soap or polish composition still remains.

Variation of the polymeric scouring pad device are also known. For example, materials having different hardnesses and, therefore, different abrasive qualities may be laminated together. In this way, one surface of the device may resent a mildly abrasive surface for scouring while an opposite surface of the device can provide a more coarsely abrasive surface. Again, however, in such devices, soap or polish composition is merely impregnated or carried in the interstices between fibers of the polymeric material from which the device is made. Thus, prior art devices provide no control over the rate at which the soap composition is released.

Mass production techniques using ultrasonic or heat-welding have been developed in the past for making products for dispensing volatile substances such as perfumes and deodorizers. For example, U.S. Pat. No. 4,094,119 (Sullivan) discloses such a process. However, use of such techniques for manufacturing scouring pad devices that release a soap or polishign composition at a controlled rate over an extended period of time are not believed to have been known in the prior art.

SUMMARY OF THE INVENTION

It is an object of the present invention to provide an improved scouring pad device that solves certain of the problems characteristic of known devices.

More particularly, it is an object of the present invention to provide a scouring pad device that is made from materials that are not subject to oxidation or rust within the normal useful life of the device.

It is a further object of the present invention to provide a scouring pad device that carries a soap or polishing composition that is released at a controlled rate over an extended period of time therefrom.

Yet another object of the present invention is to provide a method of making a scouring pad device with heat or ultrasonic welding technology on a mass production basis that achieves substantial economies.

In general accordance with the present invention, the improved scouring pad device comprises first and second bats, each made of a porour heat-weldable, polymeric material and each having an outer abrasive surface and an inner surface opposite the abrasive surface.

An envelope layer of a fluid impervious, heat-weldable, sheet-like polymeric material and having inwardly and outwardly facing surfaces, lies adjacent each of the bats with the inner surface of the bat confronting the outwardly facing surface of the envelope layer. Each of the envelope layers is perforated, having at least one hole therein.

A reservoir layer of heat-weldable, liquid absorbent material is disposed between the inwardly facing surfaces of the respective envelope layers. The reservoir layer, envelope layers, and bats are welded or fused together at a closed continuous boundary.

A soap or polishing composition is deposited in the reservoir. This composition may be a liquid or may alternatively be a solid which is soluble in water. Accordingly, when the scouring pad device is used, the soap or polishing composition is released through the hole in one or both envelope layers through the bats to the abrasive surface of the bats. The rate at which the soap composition is released is controlled by the size and number of the holes in the envelope layers. Accordingly, highly concentrated soap or polishing compositions may be used which are dispensed at a very slow rate through the holes in the envelope layers. Further, since all layers of the scouring pad are polymeric and therefore not subject to oxidation or rusting such as are steel wool scouring pads, the scouring pad of the present invention may have a long useful life.

In further general accordance with the present invention, the method of making the improved scouring pad device comprises the steps of simultaneously advancing from supplies in synchronizm and at the same rate the reservoir layer, two envelope layers and the two bats made of material such as those described above. These components of the scouring pad device are advanced with an inwardly facing surface of each of the envelope layers lying adjacent and confronting one surface of the reservoir layer and with an inner surface of each of the bats opposite its outer abrasive surface, lying adjacent and confronting an outer surface of each of the envelope layers. At least one of the envelope layers is perforated by providing a hole therethrough. The soap or polishing composition is introduced into the reservoir layer and the reservoir layer, envelope layers, and bats are welded together at a continuous, closed boundary that encloses the soap or polishing composition. The welding operation thereby defines an enclosed space in which the soap or polishing composition is initially confined. The bats, envelope layers and reservoir layer, are ultimately cut at a perimeter enclosing the boundary to form the scouring pad device and separate it from the remainder of the layers.

Accordingly, the scouring pad device may be made virtually continuously by the method of the present invention from rolled supplies of the various layers which form it. Such mass production techniques achieve substantial economies so that the scouring pad device may be made for wide distribution.

Other objects, features, and advantages of the present iention will be pointed out in, or will be understood from, the following detailed description provided in conjunction with the accompanying drawings.

BRIEF DESCRIPTION OF THE DRAWINGS

FIG. 4 is a schematic perspective view of an apparatus for practicing the method of making scouring pad devices in accordance with the present invention.

DETAILED DESCRIPTION OF THE PREFERRED EMBODIMENTS

Figure 1:
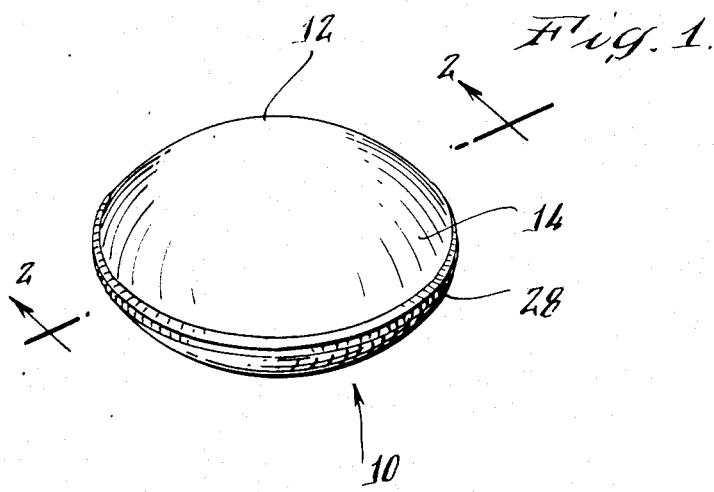
FIG. 1 is a perspective view of the scouring pad device in accordance with preferred embodiment of the present invention.
Figure 2:
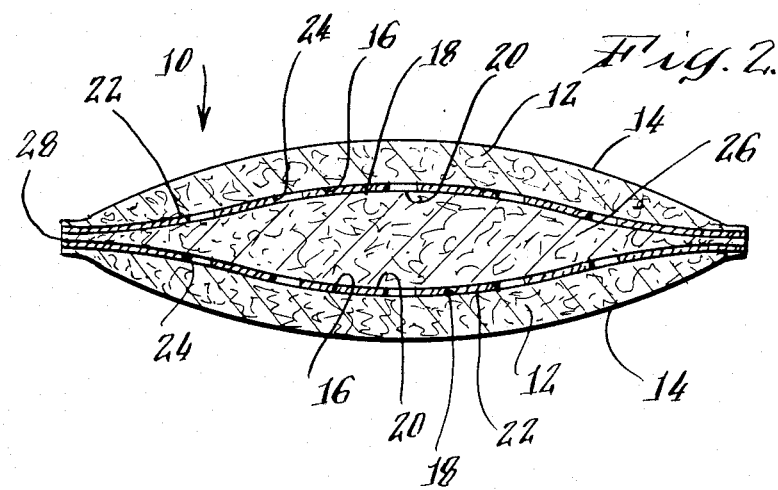
FIG. 2 is a vertical cross-sectional view of the scouring pad device in accordance with the preferred embodiment of the present invention taken through plane 2—2 in FIG. 1.
Figure 3:
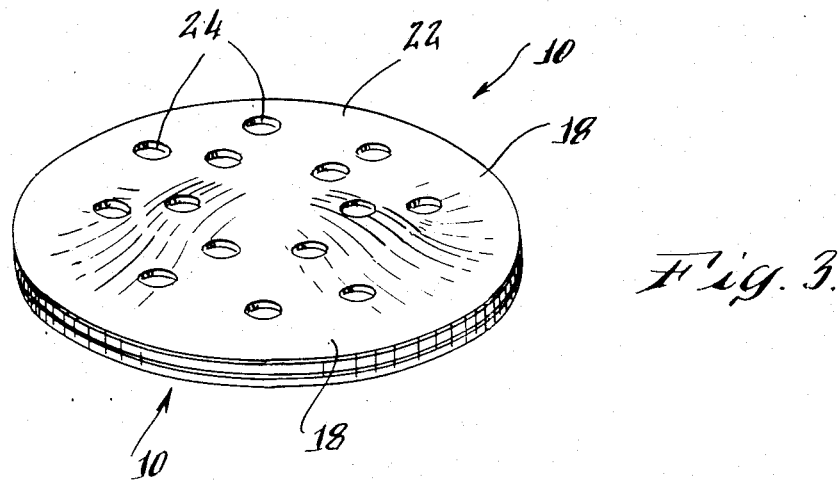
FIG. 3 is a perspective view of the scouring pad device, similar to that shown in FIG. 1, with, however, one abrasive bat removed to show how a envelope layer may be perforated so that a soap or polishing composition can be released therethrough at a controlled rate.

FIGS. 1, 2 and 3 illustrate the preferred embodiment of the scouring pad device of the present invention generally indicated at 10. As shown in the figures, the device is circular in plan view and has a relatively thin profile or thickness. It will be understood, that the scouring pad device may be made in shapes other than the circular shapes. For example, rectangular or square shapes permit maximum utilization of sheet-like materials from which the scouring pad device is made. However, it has in the past been found that it is difficult to uniformly weld the layers in polygonal shapes with ultrasonic techniques. In particular, weaknesses in the weld at corners of such shapes are sometimes found because ultrasonic energy may not be distributed equally about the periphery of, and is often weakest at the corners of, a polygonal ultrasonic welding horn. Therefore, circular shapes have been found to provide most reliable assembly when ultrasonic welding techniques are used in accordance with the method of the present invention as described in greater detail below. Other techniques of welding various components of the apparatus together such as heat welding are contemplated by the invention, however, and these may be utilized more effectively to make devices having polygonal shapes.

Referring now more particularly to FIG. 2, the scouring pad device of the present invention includes two outer bats 12 of porous, heat-weldable material, each having at least an abrasive outer surface 14 and an inner surface 16. Of course, the inner surface 16 of each bat may also be abrasive but it need not be so.

A suitable material for use as the bat in the scouring pad device of the present invention is sold by 3M Company under the Trademark "SCOTCH BRITE". This material comprises non-woven polyester fibers which are extruded from a fine aperture and spun into a bat such that the fibers adhere to one another. Extrusion and spinning is done in a random fashion. Nylon fibers spun in this fashion are also suitable. Still other polymeric heat-weldable materials having an abrasive surface such as hard synthetic sponge materials may also be used as the bat in the scouring pad device of the present invention.

Adjacent each bat lies an envelope layer 18 that has an inwardly facing surface 20 and an outwardly facing surface 22. The outwardly facing surface of the envelope layer lies adjacent and confronts the inner surface 16 of the associated bat.

The envelope layer comprises a fluid impervious, heat-welded sheet-like material. In the preferred embodiment a material such as non-porous polyester is satisfactory.

As can be seen in FIG. 3, each envelope layer is perforated as by being provided with a plurality of holes 24 organized in a relatively uniformly distributed pattern. The function of these holes will be described in greater detail below.

The scouring pad device of the present invention further comprises a reservoir layer 26 disposed between the inwardly facing surfaces 20 of the respective envelope layers 18. In the preferred embodiment, this reservoir layer comprises an absorbent non-woven polymeric material such as non-woven polyester which is capable of absorbing a liquid.

Each of the bats, envelope layers, and reservoir layer, is compressed and welded or fused together at a closed continuous boundary 28 that defines and laterally bounds a closed space between the respective enbelope layers, which in the preferred embodiment is of course occupied by the reservoir layer.

A soap or polishing compound is carried by the reservoir layer for release therefrom in a manner described in greater detail below. For purposes of this specification and the concluding claims, it is to be understood that the terms "soap composition" or "soap means" mean any of many generally known cleaning or polishing compositions. Use of the term "soap" or "soap means" is not intended to be limited to a cleaning composition.

The soap composition may be a liquid form and thus may be absorbed by the reservoir layer or may be solid and renderable into a fluid state by being dissolved in, for example, water. If a water soluble solid, the soap is carried in the interstices between fibers of the reservoir layer.

The soap composition is dispensed from the scouring pad device of the present invention by being released through the holes 24 in the envelope layers 18 and thereafter through each of the bats 12 to the abrasive surface 14 of each bat. The soap is initially essentially encapsulated in the enclosed space laterally bounded by the boundary 28 and between the envelope layers. The rate at which the soap composition is released through the envelope layers is determined by the viscosity of the soap composition and by the number and area of the holes in the envelope layers. For a soap composition having a given viscosity, the rate at which the soap composition is dispensed may be increased by increasing the number of and total area of such holes. Conversely, by decreasing the number and area of the hole, the rate at which the soap composition having known viscosity is dispensed can be decreased. Therefore, knowing the viscosity of the soap, the desired rate at which it is dispensed can be selected by choosing an appropriate number and total area of the holes 24 in the envelope layers 18.

This feature, providing controlled release of the soap composition from the scouring pad of the invention represents a substantial improvement over the known prior art devices. The pad of the invention is resistant to corrosion and therefore physical deterioration. Accordingly, a scouring pad may be provided by the invention that includes a concentrated, highly viscous soap composition released over a long period of time so that the pad has a long useful life.

FIG. 4 schematically illustrates apparatus for making the scouring pad device in accordance with the method of the present invention. As shown there, each of the respective layers of the scouring pad device is made from strip material initially rolled onto a supply to be paid out during the manufacturing process. More particularly, the reservoir layer material 26 is rolled on the supply 40 to be paid out at a given intermittent rate. A lower supply 42 of envelope layer material is mounted below the lower surface of the reservoir material as it is paid out from the reservoir material supply 40. The envelope layer material from this supply is passed through and stopped at a punching apparatus 44 where it is perforated for purposes described above. The perforated envelope layer material is then advanced into position adjacent the lower surface of the reservoir material, guided by rollers 46 and 48. After the reservoir and lower envelope layer materials are brought together, soap composition is deposited from a filling station 50 onto the upper surface of the reservoir material to be absorbed thereby. The upper envelope layer is similarly fed from a supply 52 through and stopped at a second apparatus 54 to be perforated and is subsequently advanced, guided into position adjacent the upper surface of the reservoir, after filling, by roller 56 and 58.

The reservoir layer and envelope layers are advanced at the same rate and in synchronizm. The advance of these layers is further coordinated so that the pattern of holes punched in each of the upper and lower envelope layers overlies and underlies respectively the location on the reservoir layer which have received the soap composition.

After the soap composition has been deposited in the reservoir layer and the upper and lower envelope layers are brought into confronting relation with the reservoir layer, the respective upper and lower bats are next brought into confronting relation with the envelope layers. The bats are fed from upper and lower supplied 60 and 62 again, in synchronizm and at the same rate with the other layers from which the scouring pad device of the invention is made. Thereafter, all assembled layers are passed through and stopped at a welding device, for example, an ultrasonic welding apparatus including an ultrasonic welding horn 64 that compresses all layers together against a pressure plate (not shown) and applies ultrasonic energy to them to weld all together at boundary. The horn has a peripheral shape the same as the desired shape of the scouring pad. As described above, when ultrasonic techniques are used, a round shape is most advantageous. This welding operation forms the finished shape of the scouring pad device. It further forms the enclosed space for the reservoir layer and soap composition as described above.

After the welding operation, the welded layers are advanced through and stopped at a cutting station 66 which cuts the finished scouring pad product at a periphery enclosing the welded boundaries from the remainder of the advancing supplies of materials. The finished product may be then packaged for shipment or sale as desired.

The continuous advance of supplies of the respective components of the scouring pad device of the invention permits mass production economies to be achieved. The width of the supplies is of course chosen to minimize waste of the respective materials. Further, it is possible to form several scouring pad devices at the same time by using supplies of the various components having widths sufficient to constitute several devices. Each of the operations is merely multiplied by adding stations positioned laterally across the advancing supply strips.

Accordingly, it will be appreciated that the scouring pad device of the present invention represents a substantial improvement in known scouring pad devices by having a long useful life over which a soap composition may be uniformly dispensed. Further, application of mass production technologies to manufacture the scouring pad device is permitted to be made at very low cost.

Although specific embodiments of the present invention have been described above in detail, it is to be understood that the this is for the purposes of illustration. Modifications may be made to the described scouring pad device and the method of making it in order to adapt the device and method to particular applications.

I claim:

1. A scouring pad device comprising:
   a first bat of porous, heat-weldable material having one abrasive surface and an inner surface opposite said abrasive surface;
   a first envelope layer of fluid impervious, heat-weldable sheet-like material having an inwardly facing surface and an outwardly facing surface and at least one hole therethrough, said outwardly facing surface of said first envelope layer lying adjacent said opposite surface of said bat;
   a second envelope layer of fluid impervious heat-weldable material, having an inwardly facing surface and an outwardly facing surface, said inwardly facing surfaces of first and second envelope layers laying adjacent each other;
   a reservoir of heat-weldable absorbent material lying between said inwardly facing surfaces of said first and second envelope layers and being welded thereto and to said first bat at an outer boundary, said reservoir carrying soap means which may be rendered fluidic for release at a controlled rate through said hole in said first layer and through said first bat to said abrasive surface of said first bat.

2. A scouring pad device according to claim 1 further comprising:
   a second bat of porous, heat-weldable material having a first abrasive surface and a second surface opposite said first abrasive surface lying adjacent said outwardly facing surface of said second layer; said second bat being welded to said first bat and said first and second layers at said boundary.

3. A scouring pad device accordingly to claim 2, said second envelope layer having at least one hole therein, said soap means further being releasable at a controlled rate through said hole in said second layer and through said second bat to said abrasive surface of said second bat.

4. A scouring pad device according to claim 1, 2, or 3, said first bat comprising non-woven, randomly spun, fibrous polyester.

5. A scouring pad device according to claim 1, 2, or 3, said first bat comprising non-woven, randomly spun, fibrous nylon.

6. A scouring pad device according to claim 1, 2, or 3, said first and said second envelope layers each comprising a non-porous polyester sheet.

7. A scouring pad device according to claim 1, 2, or 3, said soap means comprising a liquid metal cleaner.

8. A scouring pad device according to claim 1, 2, or 3, said soap means comprising a liquid metal polish.

9. A scouring pad device according to claim 1, 2, or 3, said soap means comprising an initially solid yet water soluble material which becomes fluidic when water infiltrates into the space between said first and said second envelope layers, said soap means thereby being releasable at a controlled rate as a fluid as aforesaid.

10. A scouring pad device comprising:
first and second bats each of a porous, fibrous, heat-weldable polymeric material and each having an outer abrasive surface and an inner surface opposite said abrasive surface;
first and second envelope layers each of a fluid impervious, heat-weldable, sheet-like polymeric material and each having an outwardly facing surface lying adjacent said inner surface of one of said bats and an inwardly facing surface, at least one of said envelope layers having at least one hole therethrough;
a reservoir layer of heat-weldable liquid absorbent material disposed between said inwardly facing surfaces of said first and second envelope layers; said first and second bats, said first and second envelope layers, and said reservoir layer being welded together at a continuous closed boundary; and
soap means initially carried in said reservoir layer confined between said first and second envelope layers within said boundary; said soap means being releasable through said hole through at least one of said bats to at least one of said abrasive surfaces.

11. A scouring pad device according to claim 10, said bat comprising non-woven, randomly spun polyester.

12. A scouring pad device according to claim 10, said bat comrprising non-woven, randomly spun nylon.

13. A scouring pad device according to claim 10, said first and said second envelope layer each comprising a non-porous, polyester sheet.

14. A scouring pad device according to claim 10, said soap means comprising a liquid metal cleaner.

15. A scouring pad device according to claim 10, said soap means comprising a liquid metal polish.

16. A scouring pad device according to claim 10, said soap means comprising an initially solid yet water soluble material which becomes fluidic when water infiltrates into the volume between said first and said second layers, said soap means thereby releasable at a controlled rate as a fluid as aforesaid.

* * * * *